(12) United States Patent
Chen et al.

(10) Patent No.: US 8,733,115 B2
(45) Date of Patent: May 27, 2014

(54) METHOD FOR CONTROLLING FREEZING CAPACITY OF A VARIABLE-FREQUENCY FREEZING AC ICE-WATER SYSTEM

(75) Inventors: Shyang-Yih Chen, Taipei (TW); Yu-Huan Wang, Taipei (TW); Chen-Kun Hsu, Taipei (TW); Ming-Hsien Pan, Taipei (TW); Pin-Chuan Chen, Taipei (TW); Ya-Ru Yang, Taipei (TW); Yan-Shao Lin, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 667 days.

(21) Appl. No.: 12/914,733

(22) Filed: Oct. 28, 2010

(65) Prior Publication Data
US 2012/0000215 A1 Jan. 5, 2012

(30) Foreign Application Priority Data

Jun. 30, 2010 (TW) .............................. 99121399 A

(51) Int. Cl.
*F25D 17/02* (2006.01)
*A23G 9/00* (2006.01)
*F25C 1/22* (2006.01)
*F25C 1/00* (2006.01)
*G05D 23/275* (2006.01)

(52) U.S. Cl.
USPC .................. 62/185; 62/342; 62/340; 62/348; 62/440; 62/201; 236/1 B

(58) Field of Classification Search
USPC .................. 62/342, 340, 348, 440, 185, 201; 236/1 B
See application file for complete search history.

(56) References Cited

U.S. PATENT DOCUMENTS

| | | | |
|---|---|---|---|
| 7,412,841 B2 * | 8/2008 | Ueda et al. .................... | 62/228.3 |
| 7,661,469 B1 * | 2/2010 | O'Loughlin ................... | 165/269 |
| 7,819,334 B2 * | 10/2010 | Pouchak et al. ............... | 237/8 R |
| 8,061,417 B2 * | 11/2011 | Gray ............................. | 165/208 |
| 2005/0156050 A1 * | 7/2005 | Shah et al. ..................... | 236/1 B |
| 2007/0063059 A1 * | 3/2007 | Votaw et al. ................... | 236/1 B |
| 2007/0240436 A1 * | 10/2007 | Landers et al. ................. | 62/157 |
| 2009/0217686 A1 * | 9/2009 | Bittner ............................ | 62/157 |
| 2010/0023171 A1 * | 1/2010 | Bittner et al. .................. | 700/282 |
| 2012/0000215 A1 * | 1/2012 | Chen et al. ...................... | 62/66 |

* cited by examiner

*Primary Examiner* — Cassey D Bauer
*Assistant Examiner* — Erik Mendoza-Wilkenfel

(57) ABSTRACT

A method for controlling freezing capacity of a variable-frequency freezing AC ice-water system separates the freezing capacity of each individual requirement end so as to reduce sudden or peak concentrating freezing demand and relieve variable-frequency load demand, and defines operating procedures corresponding to different requirement ends, respectively, wherein each of the operating procedures has a corresponding high-low temperature range that can be used as a temperature buffer zone so as to redistribute supply of the freezing capacity to each requirement end, thereby allowing the compressors thereof to operate smoothly and thus achieve energy saving as a result. The drawbacks of damaged pipelines are overcome that cause deficiency in freezing capacity as encountered in prior techniques.

10 Claims, 3 Drawing Sheets

METHOD FOR CONTROLLING FREEZING CAPACITY OF A VARIABLE-FREQUENCY FREEZING AC ICE-WATER SYSTEM

BACKGROUND OF THE INVENTION

1. Field of the Invention

The present invention relates generally to methods for controlling the freezing capacity of freezing AC ice-water systems, and more particularly, to a method for controlling freezing capacity of a variable-frequency freezing AC ice-water system.

2. Description of Related Art

Generally, requirement end equipment (e.g. air conditioners, central air conditioning systems, freezers, refrigerators etc.) in business places or office buildings for temperature control require large power output to achieve a sufficient cooling effect. Split-type chillers may have the problems of insufficiency and high cost. Multiple requirement end equipment in a business place are usually connected to a rear end chiller and exchange heat with the chiller for achieving desired cooling effects. For example, freezers and refrigerators in a supermarket or a warehouse are connected to a rear end chiller so as to allow heat exchange to occur therebetween through a cooling fluid provided by the chiller, thereby achieving freezing and refrigerating effects.

In practice, the freezing capacity supply of the chiller is very high, which accordingly results in high electric power consumption. For example, a chiller in a supermarket supplies several tons to several hundreds of tons of freezing capacity, thus resulting in high electric power consumption and high cost. If the freezing capacity during startup of the chiller can be efficiently utilized and the number of startup and shutdown events can be reduced, the cost can be greatly reduced.

In order to save electric power consumption, a variable-frequency chiller is developed, wherein the operating frequency thereof varies with the freezing capacity supply so as to reduce electric power consumption and save cost. The reason is that the freezing capacity supply of the variable-frequency chiller is positively proportional to the operating frequency of the variable-frequency chiller, and the electric power consumption is positively proportional to the cube of the operating frequency. That is, the electric power consumption is positively proportional to the cube of the freezing capacity supply. FIG. 1 is a plot showing the relationship between the electric power consumption and the supply of the variable-frequency chiller. Referring to FIG. 1, when the supply of the variable-frequency chiller is half of the maximum supply, the electric power consumption is 12.5% of the maximum electric power consumption (as shown in curve A). However, along with continuing global warming, only using the above-described variable-frequency method cannot meet the high demand for carbon emission reduction.

Therefore, it is imperative to provide a method for controlling the freezing efficiency of a variable-frequency freezing AC ice-water system so as to overcome the above-described drawbacks.

SUMMARY OF THE INVENTION

In view of the above drawbacks of the prior art, an object of the present invention is to save electric power by utilizing the characteristic of a variable-frequency chiller that its freezing capacity decreases with decreasing frequency.

Another object of the present invention is to enable a compressor to smoothly operate in a stable operating frequency and freezing capacity so as to increase its cooling efficiency and save electric power consumption.

In order to achieve the above and other objects, the present invention provides a method for controlling freezing capacity of a variable-frequency freezing AC ice-water system having a plurality of supply ends and a plurality of requirement ends, each of the requirement ends having individual current temperature and temperature loss rate and operating according to a corresponding operating procedure. The method comprises the steps of: (1) defining a plurality of operating procedures corresponding to the requirement ends, respectively, such that each of the operating procedures has a corresponding defined high-low temperature range; (2) supplying by the supply ends a current total freezing capacity required by the requirement ends so as to maintain the current temperature of each of the requirement ends to be within the corresponding high-low temperature range for a current time period; (3) assessing a predetermined total freezing capacity for maintaining each of the requirement ends within the corresponding high-low temperature range for a predetermined time period according to the current temperature and temperature loss rate of each of the requirement ends; and (4) determining whether the difference between the predetermined total freezing capacity and the current total freezing capacity reaches a certain value, if yes, utilizing the high-low temperature range of the operating procedure of each of the requirement ends as a temperature buffer zone so as to reassess the predetermined total freezing capacity required for maintaining each of the requirement ends within the corresponding high-low temperature range during the predetermined time period, until the difference between the predetermined total freezing capacity and the current total freezing capacity is less than the certain value and supplying the predetermined total freezing capacity from the supply ends for the predetermined time period, otherwise, if the difference between the predetermined total freezing capacity and the current total freezing capacity is determined to be less than the certain value, supplying the predetermined total freezing capacity from the supply ends for the predetermined time period.

In an embodiment, the predetermined total freezing capacity supplied from the supply ends further comprises a pipeline loss such as a damaged pipeline or an uneven pipeline.

In an embodiment, the high-low temperature range of each of the operating procedures further comprises a secondary high-low temperature range, and temperature values of the high-low temperature range and secondary high-low temperature range are set according to the corresponding operating procedure and used as a temperature buffer zone.

In an embodiment, a round-robin algorithm is used for controlling the requirement ends so as to cause the requirement ends to take turns in performing different operating procedures. Alternatively, a weighted algorithm is used for controlling the requirement ends so as to cause the requirement ends to take turns in performing different operating procedures according to the properties of the requirement ends.

Compared with the prior art, the present invention separates the freezing capacity of each of the requirement ends so as to reduce sudden or peak concentrating freezing demand and relieve variable-frequency load demand. The present invention can be applied to an air conditioner or a chilling system with a variable-frequency chiller so as to change the operating efficiency of the chiller and reduce electric power consumption and further improve the cooling efficiency and cost-effectiveness thereof.

DETAILED DESCRIPTION OF PREFERRED EMBODIMENTS

The following illustrative embodiments are provided to illustrate the disclosure of the present invention, these and other advantages and effects can be apparent to those in the art after reading this specification.

Figure 1:
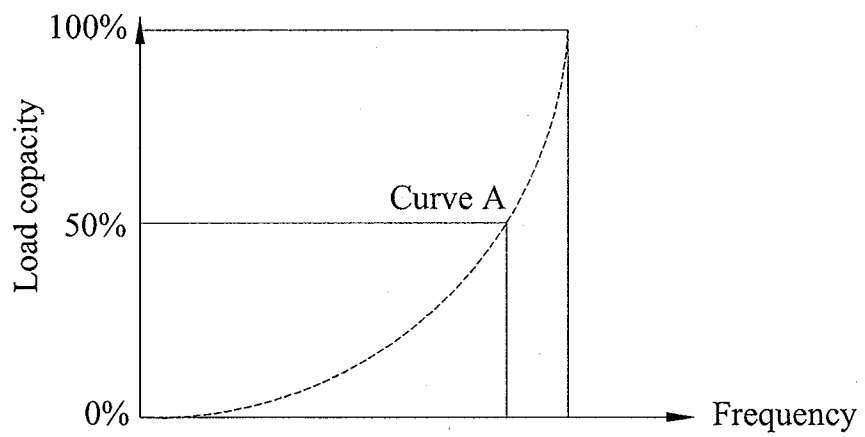
FIG. 1 is a plot illustrating the relationship between the electric power consumption and load rate of a typical variable-frequency chiller.
Figure 2:
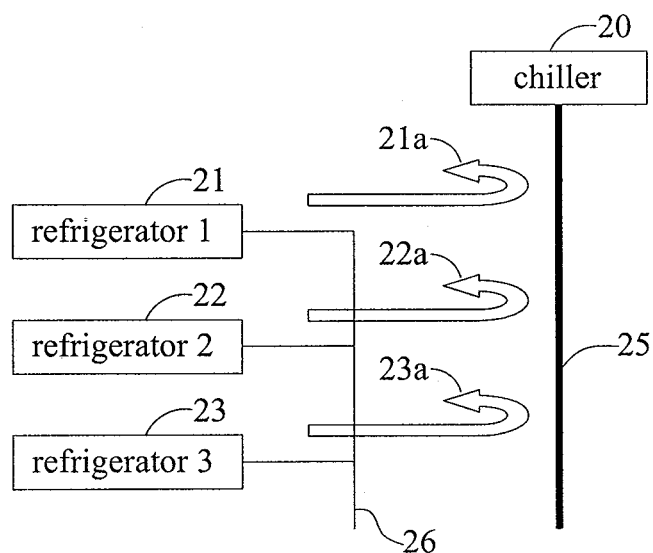
FIG. 2 is an application structure of a method for controlling freezing capacity of a variable-frequency freezing AC ice-water system of the present invention.

FIG. 2 shows an application structure of a method for controlling the freezing capacity of a variable-frequency AC ice-water system, wherein the ice-water system comprises a supply end 20 and a plurality of requirement ends 21, 22 and 23. Referring to FIG. 2, heat exchanges 21a, 22a and 23a occur between the requirement ends 21, 22 and 23 and the supply end 20 (chiller) through an ice-water pipeline 25 so as to achieve desired cooling effects. In the present embodiment, the requirement ends 21, 22 and 23 can be air conditioners, central air conditioning systems, fresh food freezers, fruit and vegetable refrigerators that need heat to be exchanged with a lower environmental temperature.

In the present invention, the freezing capacity of the supply end 20 is defined as:

ice-water flow×ice-water specific heat x (temperature difference between inlet and outlet), wherein the ice-water specific heat is the specific heat of the ice-water provided by the supply end 20, the temperature difference between inlet and outlet is the temperature difference between the ice-water provided by the ice-water pipeline 25 and the returned ice-water. Therefore, when the temperature difference between inlet and outlet is greater than a specific value, it means that the requirement ends 21, 22 and 23 require more freezing capacity. Accordingly, the supply end 20 can increase the ice-water flow so as to increase the freezing capacity, reduce the temperature difference between inlet and outlet, and achieve the desired freezing effects at the requirement ends.

In the present embodiment, each of the requirement ends 21, 22 and 23 has its individual current temperature and temperature loss rate and operates under a corresponding operating procedure. The temperature loss rate of each of the requirement ends 21, 22 and 23 depends on a lot of factors such as the characteristic of the requirement end, background environmental temperature, a damaged pipeline and so on.

The temperature loss rates of the requirement ends 21, 22 and 23 can be monitored through a monitor end 26 such that the freezing capacity demands of the requirement ends 21, 22 and 23 can be timely adjusted. Besides monitoring or measuring the states of the requirement ends 21, 22 and 23, the monitor end 26 can set the operating procedures of the requirement ends 21, 22 and 23, but it is not limited thereto. In other embodiments, different requirement ends can be respectively disposed with a corresponding monitor end. Alternatively, some of the requirement ends have individual monitor ends, and the others have a common monitor end.

In the present embodiment, the operating procedures are defined corresponding to the requirement ends 21, 22 and 23, respectively, such that each of the operating procedures has an individually defined high-low temperature range. For example, each of the requirement ends 21, 22 and 23 has a different operating temperature range. In particular, the requirement end 21 can be, for example, an air conditioner with an operating temperature range between 23° C. and 28° C., the requirement end 22 can be, for example, a fruit and vegetable refrigerator with an operating temperature range between 2° C. and 7° C., and the requirement end 23 can be, for example, a server room with an operating temperature range between 20° C. and 25° C.

The supply end 20 supplies a current total freezing capacity required by the requirement ends 21, 22 and 23 so as to maintain the individual current temperatures $T_{21}$, $T_{22}$ and $T_{23}$ of the requirement ends 21, 22 and 23 within the corresponding high-low temperature ranges for a current time period, respectively.

Further, a total freezing capacity for maintaining the requirement ends 21, 22 and 23 within the corresponding high-low temperature ranges for a predetermined time period is assessed according to the individual current temperature and temperature loss rate of each of the requirement ends 21, 22 and 23. In the present embodiment, the total freezing capacity is defined as a predetermined total freezing capacity.

If the difference between the predetermined total freezing capacity and a current total freezing capacity supplied from the supply end 20 is less than a certain value, the supply end 20 supplies the predetermined total freezing capacity to the requirement ends 21, 22 and 23 within the predetermined time period.

Otherwise, if the difference between the predetermined total freezing capacity and the current total freezing capacity supplied from the supply end 20 reaches the certain value, the predetermined total freezing capacity is reassessed by utilizing the high-low temperature range of the operating procedure of each of the requirement ends 21, 22 and 23 as a temperature buffer zone until the difference between the assessed predetermined total freezing capacity and the current total freezing capacity is less than the certain value, and the supply end 20 supplies the assessed predetermined total freezing capacity to the requirement ends 21, 22 and 23 within the predetermined time period.

For example, if the difference between the predetermined total freezing capacity assessed according to the individual temperature and temperature loss rate of each of the requirement ends 21, 22 and 23 and the current total freezing capacity supplied from the supply end 20 reaches a certain degree, the method of the present invention utilizes the high-low temperature range of the operating procedure of each of he requirement ends 21, 22 and 23 as a temperature buffer zone so as to redistribute individual freezing capacity supplied to each of the requirement ends 21, 22 and 23 and reassess the predetermined total freezing capacity until the difference between the assessed predetermined total freezing capacity and the current total freezing capacity supplied from the supply end 20 is less than the certain degree. As such, the present method can be applied to various kinds of variable-frequency chillers so as to enable the chillers to operate at stable frequencies, respectively, thereby achieving an energy-saving effect.

Figure 3:
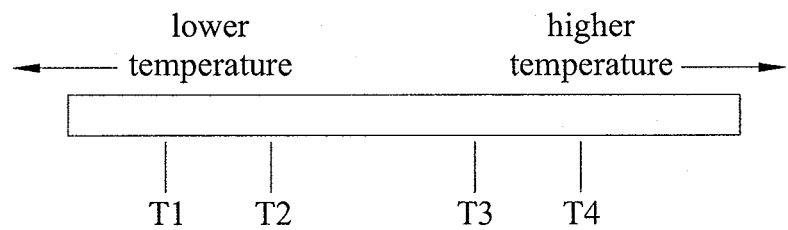
FIG. 3 is a diagram showing the operating temperature range of a requirement end according to different operating procedures.

FIG. 3 is a diagram showing the operating temperature range of a requirement end according to different operating procedures. Referring to FIG. 3, T1 is the lower edge of a high-low temperature range (the lowest temperature point), T2 is the lower edge of a secondary high-lower temperature range, T3 is the upper edge of the secondary high-lower temperature range, and T4 is the upper edge of the high-low temperature range (the highest temperature point). Different operating temperature ranges can be set according to different requirements of the requirement ends.

For example, the requirement ends 21, 22 and 23 of FIG. 2 can be set to operate under different operating procedures. In general, the operating procedures comprise, but not limited to, general operating procedures, pre-cooling procedures and deviation permit procedures.

Each of the general operating procedures allows the temperature of the corresponding requirement end to be maintained within the corresponding high-low temperature. For example, the temperature of an air conditioner can be maintained between 28° C. and 33° C. Each of the pre-cooling procedures allows the corresponding requirement end to be pre-cooled. Each of the deviation permit procedures allows the temperature of the corresponding requirement end to be maintained within the corresponding high-low temperature range, and allows the current temperature of the corresponding requirement end to be maintained within the corresponding secondary high-low temperature range by cooling or stopping cooling the requirement end when the current temperature exceed the corresponding secondary high-low temperature range for a permit time period. For example, a fruit and vegetable refrigerator allows the current temperature to be maintained between 3° C. and 6° C. (the secondary high-low temperature range). Further, in order to control the freezing capacity or save electric power, the fruit and vegetable refrigerator allows the temperature to be maintained between 0° C. and 2° C. or 8° C. and 9° C., wherein the high-low temperature range is 0° C. and 9° C.

Figure 4:
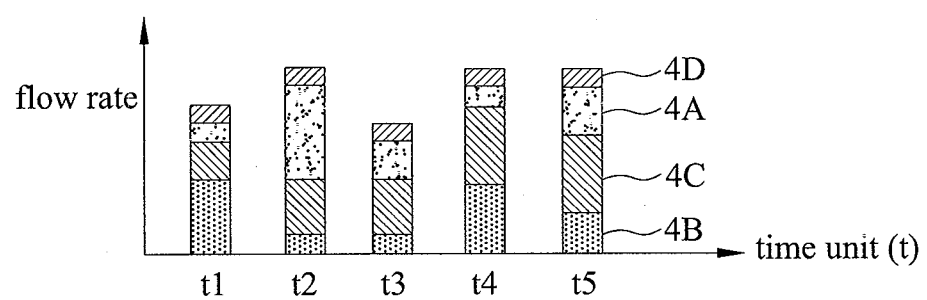
FIG. 4 is a diagram showing adjustment of the freezing capacity supplied to different requirement ends according to the method for controlling the freezing capacity of the variable-frequency AC ice-water system of the present invention.

FIG. 4 is a diagram showing adjustment of individual freezing capacities 4A, 4B and 4C supplied from the supply end 20 to the requirement ends 21, 22 and 23, respectively, according to the method of present invention. Referring to FIG. 4, the individual freezing capacities supplied from the supply end 20 to the requirement ends 21, 22 and 23 at different time units t1, t2, t3, t4 and t5 are different. A main reason is that the background environmental temperature of each of the requirement ends 21, 22 and 23 may continuously change (e.g. air temperature changes), or an external heat source appears (e.g. vegetables with higher temperature are put into the fruit and vegetable refrigerator of the requirement end 23). As such, the operating frequency or load rate of the supply end 20 continuously varies. When the variation exceeds a certain degree, the power consumption of the supply end 20 increases. Therefore, the method of the present invention is used for controlling the variation of the total freezing capacity supplied from the supply end 20 to the requirement ends 21, 22 and 23 at individual time units t1 to t5 within a certain range (which can be defined by the user) so as to save power consumption.

In the present embodiment, the requirement end 21 operates under a general operating procedure with a high-low temperature range of 28° C. to 33° C. The requirement end 22 operates under a pre-cooling procedure with a high-low temperature range of 0° C. to 9° C. The requirement end 23 operates under a deviation permit procedure with a high-low temperature range of 20° C. to 25° C. and a secondary high-low temperature range of 22° C. to 23° C. It should be noted that in different embodiments, the method of the present invention can control the requirement ends 21, 22 and 23 through a round-robin algorithm so as to enable the requirement ends 21, 22 and 23 to take turns in performing different operating procedures. Alternatively, the method of the present invention can control the requirement ends 21, 22 and 23 through a weighted algorithm so as to enable the requirement ends 21, 22 and 23 to take turns in performing different operating procedures according to the properties of the requirement ends 21, 22 and 23.

At time unit t1, the sum of the freezing capacities 4A to 4C and pipeline loss 4D is the total freezing capacity supplied by the supply end 20. By using the method of the present invention, a total freezing capacity possible to be supplied by the supply end 20 at the next time unit t2 can be assessed, and if the difference between the assessed total freezing capacity and the total freezing capacity at time unit t1 reaches a certain degree, the individual freezing capacities supplied to the requirement ends 21, 22 and 23 are redistributed.

The redistribution of the individual freezing capacities are based on the operating procedures of the requirement ends 21, 22 and 23 and the corresponding high-low temperature ranges or secondary high-low temperature ranges. For example, the requirement ends 21 and 22 operate under general operating procedures and the requirement 23 operates under a deviation permit procedure. In particular, the general operating procedures of the requirement ends 21 and 22 have high-low temperature ranges of 23° C. to 28° C. and 2° C. to 9° C., respectively, and the deviation permit procedure of the requirement end 23 has a high-lower temperature range of 20° C. to 25° C. and a secondary temperature range of 22° C. to 23° C. When the current temperature of the requirement end 21 is close to 28° C., i.e., the upper edge of the corresponding high-low temperature range, and the current temperature of the requirement end 22 is close to 9° C., i.e., the upper edge of the corresponding high-low temperature range, the current temperature of the requirement end 23 can be temporarily maintained between 23° C. and 24° C. for a time period, and within the time period, the supply end 20 can reduce the freezing capacity supplied to the requirement end 23 and distribute the reduced freezing capacity to the requirement ends 21 and 22 so as to lower the current temperatures of the requirement ends 21 and 22. As such, the total freezing capacity supplied by the supply end 20 can be stabilized through control and adjustment of the individual freezing capacities. Therefore, the method of the present invention can effectively redistribute the total freezing capacity supplied from the supply end 20 to the requirement ends 21, 22 and 23 at individual time units t1, t2, t3, t4 and t5 so as to maintain the variation of the total freezing capacity at individual time units t1, t2, t3, t4 and t5 within a certain range.

Therefore, by flexibly utilizing the characteristic that the requirement ends can operate under different operating procedures, the method of the present invention can effectively stabilize the operating frequency and load rate of the variable-frequency chiller (supply end) 20. In addition, the method of the present invention takes into account the pipeline loss 4D so as to compensate for freezing capacity deficiency caused by a damaged pipeline or the like.

Figure 5:
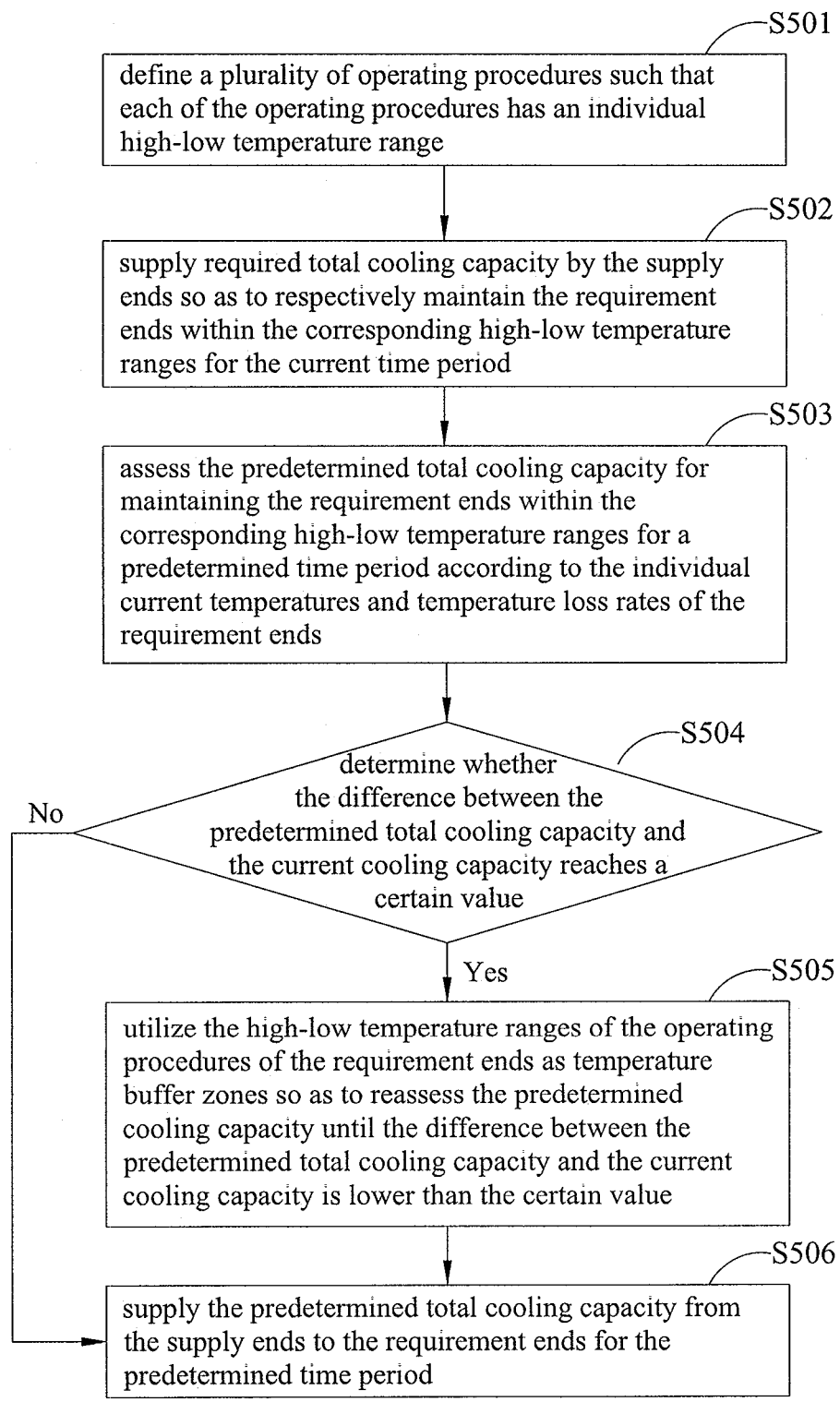
FIG. 5 is a flow diagram showing the method for controlling the freezing capacity of the variable-frequency AC ice-water system of the present invention.

FIG. 5 is a flow chart of the method for controlling the freezing capacity of a variable-frequency AC ice-water system according to the present invention. The method is applied to an ice-water system having one or more supply ends and one or more requirement ends, wherein each of the requirement ends has an individual current temperature and temperature loss rate and operates under a corresponding operating procedure.

Referring to FIG. 5, at step S501, a plurality of operating procedures is defined such that each of the operating procedures has a defined corresponding high-low temperature range. Then, the process goes to step S502.

At step S502, the supply ends supply a current total freezing capacity required so as to maintain the requirement ends within the corresponding high-low temperature ranges for a current time period, respectively. Then, the process goes to step S503.

At step S503, a predetermined total freezing capacity for maintaining the requirement ends within the corresponding high-low temperature ranges for a predetermined time period is assessed according to the individual current temperature and temperature loss rate of each of the requirement ends. Then, the process goes to step S504.

At step S504, whether the difference between the predetermined total freezing capacity and the current freezing capacity reaches a certain value is determined, if yes, the process proceeds to step S505, otherwise, the process proceeds to step S506.

At step S505, the predetermined freezing capacity is reassessed by utilizing the high-low temperature range of the operating procedure of each of the requirement ends as a temperature buffer zone until the difference between the predetermined total freezing capacity and the current total freezing capacity is determined to be less than the certain value. Then, the process proceeds to step S506.

At step S506, the predetermined total freezing capacity is supplied by the supply ends for the predetermined time period.

Therefore, the method of the present invention separates the freezing capacity of each of the requirement ends so as to reduce sudden or peak concentrating freezing demand and relieve variable-frequency load demand.

Compared with the prior art, the present invention effectively utilizes the characteristic that the freezing capacity of a variable-frequency chiller decreases with decreasing frequency to enable the compressor to smoothly operate in a stable operating frequency and freezing capacity, thereby improving the cooling efficiency and reducing power consumption. Further, the present invention can be applied to an air conditioner or a chilling system with a variable-frequency chiller so as to change the operating efficiency of the chiller and reduce electric power consumption and further improve the cooling efficiency and cost-effectiveness thereof.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A method for controlling freezing capacity of a variable-frequency freezing AC ice-water system having a plurality of supply ends and a plurality of requirement ends, each of the requirement ends having individual current temperature and temperature loss rate and operating according to a corresponding operating procedure, the method comprising the steps of:
   (1) defining a plurality of operating procedures corresponding to the requirement ends, respectively, such that each of the operating procedures has a corresponding defined high-low temperature range;
   (2) supplying by the supply ends a current total freezing capacity required by the requirement ends so as to maintain the current temperature of each of the requirement ends within the corresponding high-low temperature range during a current time period;
   (3) assessing a predetermined total freezing capacity required to maintain each of the requirement ends within the corresponding high-low temperature range for a predetermined time period according to the current temperature and temperature loss rate of each of the requirement ends; and
   (4) determining whether a difference between the predetermined total freezing capacity and the current total freezing capacity reaches a certain value, if yes, utilizing the high-low temperature range of the operating procedure of each of the requirement ends as a temperature buffer zone so as to reassess the predetermined total freezing capacity required for maintaining each of the requirement ends within the corresponding high-low temperature range during the predetermined time period, until the difference between the predetermined total freezing capacity and the current total freezing capacity is less than the certain value, and supplying the predetermined total freezing capacity from the supply ends for the predetermined time period, otherwise, if the difference between the predetermined total freezing capacity and the current total freezing capacity is determined to be less than the certain value, supplying the predetermined total freezing capacity from the supply ends for the predetermined time period.

2. The method of claim 1, wherein the current total freezing capacity further comprises a pipeline loss.

3. The method of claim 1, wherein the predetermined total freezing capacity further comprises a pipeline loss.

4. The method of claim 1, wherein the high-low temperature range of each of the operating procedures further comprises a secondary high-low temperature range, and temperature values of the high-low temperature range and secondary high-low temperature range are set according to the corresponding operating procedure.

5. The method of claim 1, wherein the operating procedures comprise general operating procedures, pre-cooling procedures and deviation permit procedures, wherein each of the general operating procedures allows the current temperature of the corresponding requirement end to be maintained within the corresponding high-low temperature range, each of the pre-cooling procedures allows the corresponding requirement end to be pre-cooled, and each of the deviation permit procedures allows the current temperature of the corresponding requirement end to be maintained within the corresponding high-low temperature range and allows the current temperature of the corresponding requirement end to be maintained within the corresponding secondary high-low temperature range by cooling or stopping cooling the requirement end, when the current temperature exceeds the corresponding secondary high-low temperature range for a permit time period.

6. The method of claim 1, wherein step (1) further comprises controlling the requirement ends through a round-robin algorithm so as to enable the requirement ends to take turns in performing different operating procedures.

7. The method of claim 1, wherein step (1) further comprises enabling the requirement ends to perform different operating procedures according to properties of the requirement ends.

8. The method of claim 1, wherein step (1) further comprises controlling the requirement ends through a weighted algorithm so as to enable the requirement ends to take turns in performing different operating procedures according to properties of the requirement ends.

9. The method of claim 1, wherein the supply ends are variable-frequency chillers.

10. The method of claim 1, wherein the requirement ends are refrigerators, freezers, blowers and/or air conditioners.

* * * * *